(12) United States Patent
Houssat et al.

(10) Patent No.: US 10,759,391 B2
(45) Date of Patent: Sep. 1, 2020

(54) END FITTING FOR A WIPER BLADE OF A MOTOR VEHICLE

(71) Applicant: Valeo Systèmes d'Essuyage, Le Mesnil Saint Denis (FR)

(72) Inventors: Stéphane Houssat, Issoire (FR); Vincent Gaucher, Issoire (FR); Olivier Jomard, Issoire (FR); Guillaume Mouleyre, Issoire (FR); Eric Poton, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 23 days.

(21) Appl. No.: 16/002,032

(22) Filed: Jun. 7, 2018

(65) Prior Publication Data

US 2018/0354465 A1     Dec. 13, 2018

(30) Foreign Application Priority Data

Jun. 8, 2017  (FR) ...................................... 17 55106

(51) Int. Cl.
*B60S 1/38* (2006.01)

(52) U.S. Cl.
CPC ........... *B60S 1/3894* (2013.01); *B60S 1/3806* (2013.01); *B60S 1/3887* (2013.01); *B60S 1/3889* (2013.01); *B60S 2001/3822* (2013.01)

(58) Field of Classification Search
CPC .... B60S 1/3889; B60S 1/3886; B60S 1/3894; B60S 1/3891; B60S 1/3893; B60S 1/3806; B60S 1/3896; B60S 2001/3822

(Continued)

(56) References Cited

FOREIGN PATENT DOCUMENTS

DE    202011003000 U1    4/2011
DE    102012207213 A     10/2013

(Continued)

OTHER PUBLICATIONS

Machine translation of description portion of German publication 202011003000, published Jun. 2011. (Year: 2011).*

(Continued)

*Primary Examiner* — Gary K. Graham
(74) *Attorney, Agent, or Firm* — Osha Liang LLP

(57) ABSTRACT

End piece (8) configured for installation at a longitudinal extremity (7) of a windscreen wiper (1), the end piece (8) comprising an internal volume (13) and a peripheral wall (12) which delimits the internal volume (13), the end piece (8) comprising at least a first housing (14) configured to accommodate a heel (5*a*) of a wiper blade (5) and being in communication with a slot (19) which passes through the peripheral wall (12), the slot (19) being delimited by sides (18), the first housing (14) extending longitudinally from an inlet (21), through which the heel (5*a*) of the wiper blade (5) may be introduced into the first housing (14), and extending preferably as far as a bottom wall (12*a*) of the peripheral wall (12), the first housing (14) being delimited by a longitudinal wall (17) disposed in the internal volume (13), characterized in that a first distance D1 measured at the inlet (21) between one of the sides (18) delimiting the slot (19) and the longitudinal wall (17) is greater than a second distance D2 separate from the first distance D1 and measured parallel to the first distance D1, the second distance D2 being measured between one of the sides (18) of the slot (19) and the longitudinal wall (17).

10 Claims, 4 Drawing Sheets

(58) Field of Classification Search
USPC ........ 15/250.43, 250.451, 250.452, 250.453, 15/250.454, 250.44
See application file for complete search history.

(56) References Cited

FOREIGN PATENT DOCUMENTS

| | | |
|---|---|---|
| EP | 3081438 A1 | 10/2016 |
| FR | 2 868 748 A1 | 10/2005 |

OTHER PUBLICATIONS

Preliminary Report and Opinion Issued in Corresponding French Application No. 1755106, dated Apr. 13, 2018 (7 Pages).

* cited by examiner

END FITTING FOR A WIPER BLADE OF A MOTOR VEHICLE

The field of the present invention is that of wiper systems intended to equip a motor vehicle. It has as its object an end piece intended to be (disposed at one extremity of a windscreen wiper of a suchlike wiper system.

A motor vehicle is commonly equipped with a wiper system intended to remove, by wiping, any liquids and dirt which may obscure the view that a driver of the motor vehicle has of his environment. Said wiper systems generally comprise a driving arm which performs an angular reciprocal movement about an axis of rotation, and an elongated windscreen wiper equipped with a wiper blade made from an elastic material. By rubbing against a glazed surface, front or rear, of the motor vehicle, the wiper blade wipes the water and a certain quantity of dirt therefrom and removes them from the field of vision of the driver.

Whatever the configuration of the windscreen wiper, that is to say either a windscreen wiper containing articulated mountings which hold the wiper blade in a plurality of separate zones, or a windscreen wiper containing at least one structural element which holds the wiper blade for the whole of its length, otherwise known as a "flat blade", the windscreen wiper is attached to a terminal part of the driving arm by means of a connection device which comprises a connecter mounted integrally with the windscreen wiper.

At each of the longitudinal extremities of the windscreen wiper in its "flat blade" variant, the wiper blade and the structural element are equipped with an end piece which facilitates the integral attachment of the wiper blade and of the structural element one to the other.

Conventionally, said end pieces comprise a space configured to accommodate a portion of the wiper blade, another space configured to accommodate the structural element and a means enabling the end piece to be held in position on the structural element.

The structural element makes it possible to generate a curve of the windscreen wiper, in order for the latter to follow the curvature of the glazed surface to be wiped and thereby to be capable of wiping it effectively. Nevertheless, the curve generated by said structural element is not sufficient, in particular with regard to a portion of the glazed surface exhibiting a greater curvature, as is the case, for example, in zones of the front windscreen of a motor vehicle which border on pillars of said windscreen. Furthermore, the space of the end piece dedicated to the accommodation of the structural element extends in a rectilinear plane and therefore opposes the curve of the structural element. Said two aspects mean that, in said portion of the glazed surface, the wiper blade is not in contact with the glazed surface and is accordingly not able to wipe said portion of the glazed surface in a proper manner.

The present invention aims to address this problem by proposing an end piece for a windscreen wiper making it possible to obtain an inclination of an extremity of the wiper blade in order for the latter to be brought into contact with the glazed surface in order to be able to wipe it and the clear it of accumulated dirt and/or water.

The object of the present invention thus relates to an end piece configured for installation at a longitudinal extremity of a windscreen wiper, the end piece comprising an internal volume and a peripheral wall which delimits the internal volume, the end piece comprising a first housing configured to accommodate a heel of a wiper blade and being in communication with a slot which passes through the peripheral wall, the slot being delimited by sides, the first housing extending longitudinally from an inlet, through which the heel of the wiper blade may be introduced into the first housing, and extending preferably as far as a bottom wall of the peripheral wall, the first housing being delimited by a longitudinal wall disposed in the internal volume. According to the present invention, a first distance D1 measured at the inlet between one of the sides delimiting the slot and the longitudinal wall is greater than a second distance D2 separate from the first distance D1 and measured parallel to the first distance D1, the second distance D2 being measured between one of the sides of the slot and the longitudinal wall.

Advantageously, the second distance D2 may be measured as close as possible to a bottom wall delimiting the first housing.

The expression "at the inlet" is intended to denote the fact that the first distance D1 is measured at said inlet. In other words, said first distance D1 is measured in a straight line passing through a plane containing said inlet.

The first distance D1 and the second distance D2 are measured in two parallel straight lines and at two different points on the end piece, advantageously along two straight lines respectively perpendicular to a lower wall of the peripheral wall, said lower wall of the peripheral wall being penetrated by the slot of the first housing.

The slot through which the first housing discharges into the peripheral wall passes through the lower wall of the peripheral wall. The sides delimiting said slot thus comprise, respectively, two edges, being a first edge oriented towards the internal volume of the end piece and a second edge oriented towards an external environment of the end piece. In other words, said second edge is oriented in a direction opposite to the internal volume of the end piece.

According to the invention, the expression "sides of the slot" makes reference to the second edge of one of the sides of the slot.

According to one effect of the invention, the difference between the first distance D1 and the second distance D2 makes it possible to generate an inclination of an extremity of the wiper blade accommodated in said first housing. Said inclination permits the wiper blade to adapt to the curvature of a glazed surface that it is intended to wipe, in particular in the lateral zones of said glazed surface which are bordered by the pillars of the vehicle for supporting a roof and the glazed surface. The difference between the first distance D1 and the second distance D2 is also selected in such a way as not to interfere with the wiping of the blade in the central zone of the glazed surface, the central zone being disposed between the lateral zones of said glazed surface. It will be appreciated that the curve of the structural element of the blade is configured in order to accept the deformation imposed by the end piece.

Thanks to the invention, the wiper blade is thus disposed in contact with said glazed surface, along the whole of its path on said glazed surface, thereby ensuring optimal cleaning of said latter and making it possible to ensure the comfort and the safety of the driver and his passengers.

According to a characterizing feature of an aspect of the present invention, the end piece comprises a second housing configured to accommodate a structural element of the windscreen wiper, the second housing being delimited at least by the longitudinal wall and advantageously by the peripheral wall of the end piece.

According to an illustrative embodiment, a bottom wall of the peripheral wall delimits both the first housing and the second housing. According to this illustrative embodiment, the first housing is thus delimited by the lower wall of the peripheral wall penetrated by the slot and by the bottom wall of said peripheral wall.

According to a first illustrative embodiment of the present invention, the longitudinal wall forms, together with a plane containing the sides of the slot, an angle of between 3° and 6°. Advantageously, the longitudinal wall forms, together with the plane containing the sides of the slot, an angle of between 4° and 5°. Even more advantageously, said angle is equal to, or substantially equal to 4.17°, a suchlike value corresponding to the curvature of the lateral zones of the glazed surface.

As previously, the expression "side of the slot" is intended to denote the second edge of one of the sides delimiting the slot, said second edge being oriented towards the external environment of the end piece.

According to a second illustrative embodiment of the present invention, the peripheral wall comprises a first face oriented towards the first housing, and the longitudinal wall comprises a face oriented towards the first housing, the first face of the peripheral wall extending in a first plane, the face of the longitudinal wall extending in a second plane, the first plane and the second plane being parallel.

According to a characterizing feature of said second illustrative embodiment, the first plane containing the first face of the peripheral wall and the second plane containing the face of the longitudinal wall are secant with the plane containing the sides of the slot.

It will thus be appreciated that the first face of the peripheral wall and the face of the longitudinal wall, both oriented towards the first housing, are inclined, said inclination being generated by the difference between the previously mentioned distances D1 and D2.

According to a general characterizing feature of the present invention, the first distance D1 and the second distance D2 are measured between one of the sides of the slot and the first face of the longitudinal wall oriented towards the first housing.

According to a third illustrative embodiment of the present invention, the longitudinal wall supports a protrusion emerging into the first housing of the end piece, the second distance D2 being measured at said protrusion.

According to said third illustrative embodiment, the second distance D2 is measured between one of the sides of the slot and a point of the protrusion supported by the longitudinal wall, for example a point of said protrusion closest to the slot.

According to one characterizing feature of the present invention, the first housing is preferably delimited longitudinally by a bottom wall of the peripheral wall. According to the third illustrative embodiment of the present invention, the protrusion may be supported on said bottom wall.

The expression "supported" is intended to denote that said protrusion is integrally formed with the bottom wall delimiting longitudinally the first housing. In other words, said bottom wall and the protrusion form a one-piece assembly, that is to say an assembly which may not be separated without causing damage to the bottom wall or the protrusion.

According to a feature of the present invention, the protrusion is formed integrally with the longitudinal wall which supports it.

According to the third illustrative embodiment of the present invention, the first face of the peripheral wall oriented towards the first housing and the face of the longitudinal wall oriented towards the first housing may extend in parallel planes.

According to a feature of the present invention, the end piece may comprise at least one means of attachment of the end piece to the structural element.

According to one characterizing feature of the present invention, the peripheral wall delimiting the end piece may comprise a structure arranged in order to accommodate a terminal extremity of an air deflector. More specifically, an upper wall of the peripheral wall, partially delimiting the second housing, may comprise said structure arranged in order to accommodate the terminal extremity of an air deflector.

The invention also concerns a windscreen wiper comprising at least one wiper blade, at least one structural element, and at least one end piece according to any one of the illustrative embodiments of the present invention.

According to a characterizing feature of the present invention, the structural element may comprise at least one notch adapted to cooperate with at least one means of attachment of the end piece to the structural element.

According to another characterizing feature of the present invention, the windscreen wiper may also comprise an air deflector. According to said other characterizing feature of the present invention, the end piece exhibits the structure arranged in order to cover a terminal extremity of said air deflector.

The present invention further concerns a wiper system comprising a windscreen wiper according to the present invention, said windscreen wiper being connected to a driving arm by a connection device.

Other characterizing features, details and advantages will emerge more clearly from a perusal of the detailed description provided below for information purposes in relation to the different illustrative embodiments illustrated in the following Figures.

Figure 1:
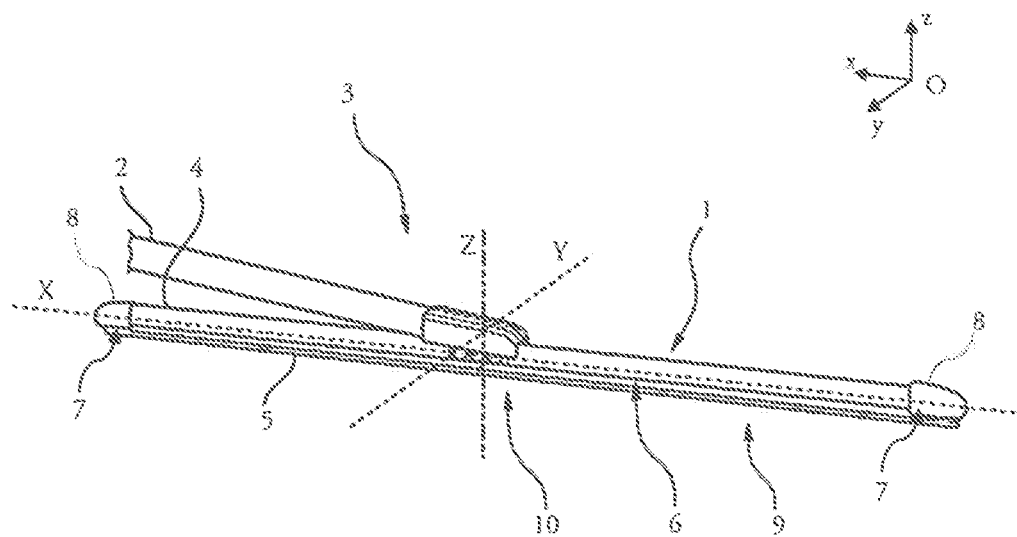
FIG. 1 represents schematically a wiper system according to the present invention.

In the Figures, the designations longitudinal, transversal, vertical, lateral, left, right, upper, lower, refer to the orientation, in an orthonormal coordinate system Oxyz, of a windscreen wiper 1 illustrated in FIG. 1. In this coordinate system, the axis Ox represents the longitudinal direction, the axis Oy represent the transversal direction, and the axis Oz represent the vertical direction of the object under consideration, in particular the end piece or the windscreen wiper. In this coordinate system, a vertical longitudinal plane is parallel to the plane Oxz, a vertical transversal plane is parallel to the plane Oyz, and a horizontal longitudinal plane is parallel to a plane Oxy.

In FIG. 1, a windscreen wiper 1 of the present invention extends in a longitudinal axis X, parallel to the axis Ox. The designations left and right must be considered in relation to a position along a transversal axis Y, parallel to the axis Oy, to either side of the longitudinal axis X. A vertical axis Z symbolizes a vertical direction, parallel to that of the axis Oz, which is perpendicular to the directions longitudinal and transversal directions described above. The designations upper or lower relate to orientations along the vertical axis Z, the designation lower containing the plane of the glazed surface.

For the longitudinal direction, the designations external or internal must be considered in relation to a pivot point of the windscreen wiper on its driving arm, the designation internal corresponding to the part where the driving arm and a half blade extend, the designation external corresponding to the part where the other half blade extends.

A motor vehicle is commonly equipped with a wiper system 3 in order to remove any water and/or dirt that are present on the glazed surface, in particular a rear window or a front windscreen of a motor vehicle. As illustrated in FIG. 1, the wiper system 3 comprises a driving arm 2 which is adapted to perform an angular reciprocal movement along and above the glazed surface.

The wiper system 3 also comprises the windscreen wiper 1 which extends in the longitudinal axis X. The windscreen wiper 1 comprises a wiper blade 5 which also extends in this longitudinal axis X and at least one air deflector 4. The air deflector 4 is provided in order to transform a pressure applied by a flow of air circulating along the glazed surface into a bearing force of the windscreen wiper 1 against the glazed surface of the motor vehicle.

The wiper blade 5 is the component part of the windscreen wiper 1 in direct contact with the glazed surface in order to remove any water and/or dirt that are present on the latter. The wiper blade 5 is a flexible blade, for example, in particular made from an elastic material, such as a polymer or a rubber.

The windscreen wiper 1 also comprises a structural element 6 which imparts a certain deformation to the windscreen wiper 1 in the plane Oxz, in such a way as to distribute the bearing force of the driving arm 2 along the windscreen wiper 1. Said deformation also permits the windscreen wiper 1 to adapt to the curvature of the glazed surface.

The structural element 6 may be a metallic strip, for example, otherwise known as a vertebra, which extends in the longitudinal axis X. A suchlike vertebra may be single, although the structural element 6 may also comprise two of said vertebrae, which are then disposed next to each other in the plane Oxy. Said structural element 6 may also comprise a support in which a metallic strip is accommodated, said support also making it possible to retain the wiper blade 5.

The windscreen wiper 1 similarly comprises an end piece 8 at each of its longitudinal extremities 7. Each end piece 8 is provided in order to keep the wiper blade 5 and the structural element 6 together. Said end pieces 8 also have a protection function and an aesthetic function, and they also have the ability, for example, to cover a terminal part of the air deflector 4. The structural element 6 thus extends from a first longitudinal extremity 7 of the windscreen wiper 1 to a second longitudinal extremity 7 of the same windscreen wiper 1, between two end pieces 8.

The air deflector 4, the wiper blade 5 and the structural element 6 form a semi-rigid structure 9 which is supported by a connection device 10, interposed between a terminal part of the driving arm 2 and the semi-rigid structure 9. A suchlike connection device 10 comprises, for example, a connector that is integral, at least in an isostatic manner, with the semi-rigid structure 9, and an adapter linked to the connector by a pivot linkage.

As illustrated in FIG. 1, the windscreen wiper 1 comprises an end piece 8 at each of its longitudinal extremities 7. It will be appreciated that least one of these two end pieces 8 is realized according to a feature of the present invention.

One aim of the present invention is to ensure contact between a longitudinal extremity of the wiper blade 5 situated furthest from a point of rotation of the driving arm 2 on the motor vehicle and the glazed surface, and, more particularly, a lateral zone of said glazed surface. The end piece 8 according to the present invention may thus be disposed at only one of the two longitudinal extremities 7 of the windscreen wiper 1, in this particular case the external longitudinal extremity 7. It will be nevertheless be appreciated that said windscreen wiper 1 may comprise two end pieces 8 according to the present invention, respectively disposed at each of the two longitudinal extremities 7 of the windscreen wiper 1, without departing from the field of the present invention.

Figure 2:
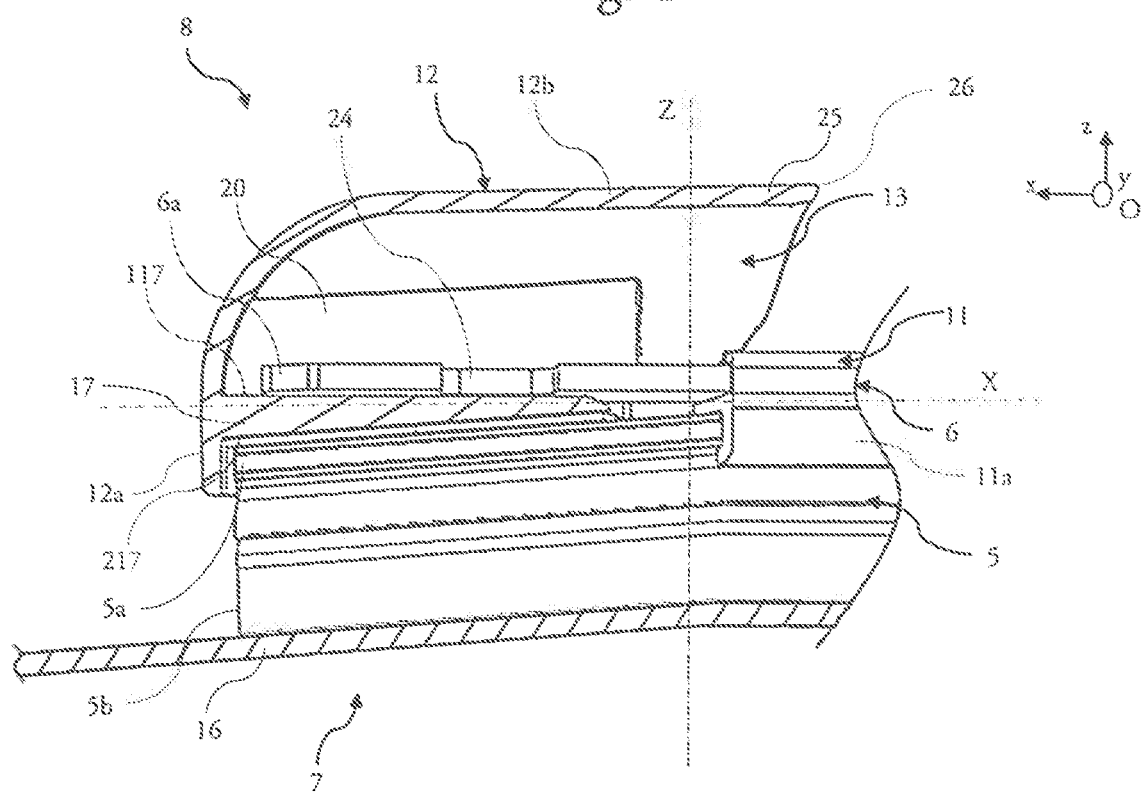
FIG. 2 is a representation of an extremity of a windscreen wiper comprising an end piece according to the present invention, said end piece being cut in a longitudinal plane, in this case vertically, in order to expose a wiper blade and a structural element of the windscreen wiper.

FIG. 2 is a view in perspective of one of the longitudinal extremities 7 of the windscreen wiper 3. This longitudinal extremity 7 is covered by an end piece 8 according to the present invention. In said FIG. 2, the end piece 8 is represented in section, said section being realized in a vertical longitudinal plane parallel to the plane Oxz of the orthonormal coordinate system in order to make the longitudinal extremity 7 of the windscreen wiper 1 in question visible.

According to an example illustrated in said Figure, the structural element 6 may comprise a support 11, in which a longitudinal channel is provided, a single metallic strip 6a being inserted into said longitudinal canal. In such a case, the support 11 may comprise two hooks 11a—only one being represented in said FIG. 2—which retain the wiper blade 5 by its heel 5a, the support 11 thereby ensuring a mechanical link between the wiper blade 5 and the single metallic strip 6a.

As is visible in FIG. 2, the metallic strip 6a comprises a notch 24 configured in order to cooperate with a means of attachment of the end piece 8.

The end piece 8 extends primarily in the longitudinal axis X and comprises a peripheral wall 12 which delimits an internal volume 13 of said end piece 8. In other words, said peripheral wall 12 is a boundary between the internal volume 13 of the end piece 8 and an external environment of said end piece 8.

Said peripheral wall 12 preferably comprises a bottom wall 12a, an upper wall 12b and a lower wall, the upper wall 12b and the lower wall being advantageously connected to each other by the bottom wall 12a. The lower wall is more fully described in the rest of the description, with reference to FIG. 3.

The upper wall 12b and the lower wall also come together in the area of lateral portions of the peripheral wall 12, as will be described below, with reference to FIG. 3. The bottom wall 12a is preferably continuous and regular between the upper wall 12b and the lower wall.

The upper wall 12b and the lower wall are preferably delimited respectively, longitudinally, on the one hand by the bottom wall 12a and on the other hand by a portion of the longitudinal extremity 26. The portion of the longitudinal extremity 26 of the upper wall 12b and the portion of the longitudinal extremity of the lower wall come together and delimit, jointly, an orifice through which the end piece 8 may be introduced onto the longitudinal extremity 7 of the windscreen wiper 1.

The end piece 8 according to the present invention comprises a first housing configured to accommodate the wiper blade 5 of the windscreen wiper and a second housing configured to accommodate the metallic strip 6a.

The first housing is preferably delimited longitudinally by the bottom wall 12a of the peripheral wall 12 and by an inlet configured in order to permit the introduction of the heel 5a of the wiper blade 5. Said first housing is preferably delimited vertically, that is to say in a vertical direction Z, by the lower wall of the peripheral wall 12 and by a longitudinal wall 17 emerging from the bottom wall 12a of the peripheral wall 12.

As illustrated in FIG. 2, the longitudinal wall 17 preferably emerges from the bottom wall 12a of the peripheral wall 12 and extends longitudinally into the internal volume 13 of the end piece 8, for example between the first housing and the second housing.

As will be described more fully in the rest of the description, the first housing passes through the peripheral wall 12 via a slot, and, more specifically, the first housing passes through the lower wall of the peripheral wall 12 by means of said slot.

Said first housing is configured to accommodate the heel 5a of the wiper blade 5, and, more precisely, a longitudinal extremity of the heel 5a of said wiper blade 5. The wiper blade 5 similarly comprises a lip 5b emerging from the heel 5a and extends through the slot via which the first housing discharges into the peripheral wall 12.

As illustrated, said lip 5b is intended to come into contact with the glazed surface 16 in order to wipe away any dirt and/or water, as previously mentioned.

The second housing, for its part, is delimited, for example, at least by the bottom wall 12a of the peripheral wall 12, by at least one pillar 20 emerging from the upper wall 12b of the peripheral wall 12 and extending in the vertical direction Z, and by the longitudinal wall 17 emerging from the bottom wall 12a of said peripheral wall 12 and also delimiting the first housing.

According to one illustrative embodiment, not illustrated here, the second housing may be delimited peripherally and in its entirety by internal walls of the end piece, that is to say walls extending into the internal volume of said end piece.

Said second housing is configured to accommodate an extremity of the structural element 6. According to the example illustrated in FIG. 2, said second housing thus accommodates an extremity of the metallic strip 6a forming an example of the structural element 6.

The longitudinal wall 17 comprises a first face 117 oriented towards the second housing and a second face 217 oriented towards the first housing. As can be seen in FIG. 2, the first face 117 of the longitudinal wall 17 is disposed in contact with the metallic strip 6a, and the second face 217 of said longitudinal wall 17, for its part, is oriented towards the heel 5a of the wiper blade 5 and may come into contact with said heel 5a.

As may be seen in FIG. 2, the end piece 8 according to the present invention is configured in order to generate an inclination of the wiper blade 5, and, more specifically, in order to generate an inclination of the longitudinal extremity of the wiper blade 5 accommodated in the first housing 14 of said end piece 8 in relation to the rest of the wiper blade 5.

The expression "inclination" is intended to denote an inclination in a vertical longitudinal plane parallel to the plane Oxz.

Thanks to said inclination, the longitudinal extremity of the wiper blade 5 adapts to the curvature of the glazed surface 16, and the longitudinal extremity of the wiper blade 5 is thus in contact with said glazed surface 16 in the lateral zone of said glazed surface where the curvature is more pronounced.

As partially illustrated in FIG. 2, the peripheral wall 12 may comprise a structure 25 arranged in order to accommodate the terminal part of the air deflector of the windscreen wiper. More specifically, said structure 25 is provided by the upper wall 12b of said peripheral wall 12.

Figure 3:
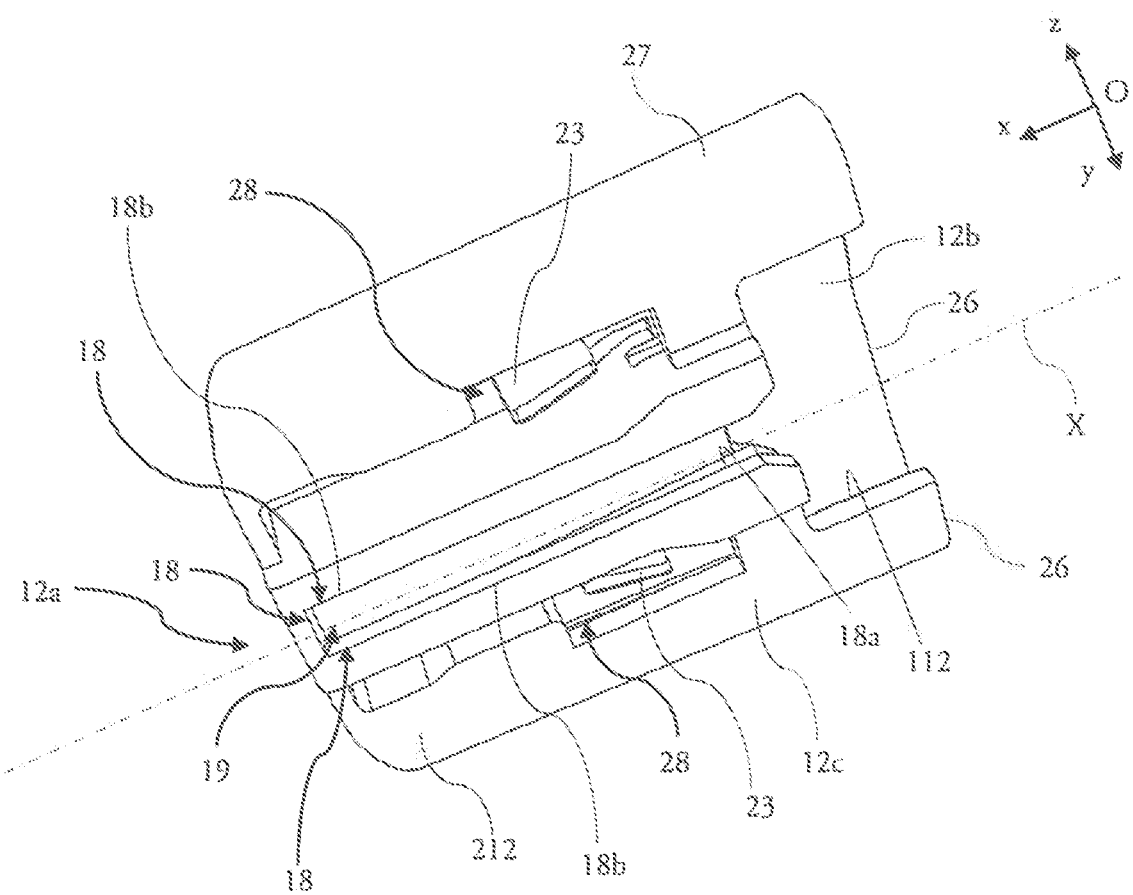
FIG. 3 is a view in perspective from below of the end piece according to the present invention.

FIG. 3 is a view in perspective from below of the end piece 8 according to the present invention. The lower wall 12c of the peripheral wall 12, as well as the lateral portions 27 of said peripheral wall 12, in the area of which the lower wall 12c and the upper wall 12b mentioned previously come together, are visible in particular in said Figure.

As illustrated in said FIG. 3, the lower wall 12c of the peripheral wall 12 is perforated. Said lower wall 12c comprises in particular the slot 19 through which the first housing discharges into the peripheral wall 12. Said slot 19 is arranged longitudinally from the orifice through which the end piece is introduced onto the windscreen wiper and preferably towards the bottom wall 12a of the peripheral wall 12.

Said slot 19 is delimited by at least three sides 18. Said sides 18 are arranged in the form of a "U" in order to permit the introduction of the wiper blade into the first housing. Each of said sides 18 comprises at least one first edge 18a oriented towards the first housing and a second edge 18b oriented towards the external environment of the end piece 8, that is to say in a direction opposite the internal volume 13 of said end piece 8.

The lower wall 12a of the peripheral wall 12 comprises a first face 112 oriented towards the internal volume 13, and accordingly towards the first housing which it partially delimits, and a second face 212 oriented towards the external environment of the end piece 8.

Two perforations 28 are also provided in the lower wall 12c, to either side of the slot 19. Each of said perforations 28 exposes a means of attachment 23 intended to cooperate with the notch arranged on the metallic strip, as previously described.

A more detailed description is now provided of the end piece 8 according to a feature of the present invention making it possible to obtain the inclination of the longitudinal extremity of the wiper blade 5 accommodated in said end piece 8. Said end piece 8 may be realized according to different illustrative embodiments, each of said illustrative embodiments being described below with reference to FIGS. 4 to 6. Said FIGS. 4 to 6 are respectively views in perspective of a vertical longitudinal section, in other words a section in a plane parallel to the plane Oxz, of an end piece 8 according to a first illustrative embodiment, according to a second illustrative embodiment and according to a third illustrative embodiment of the present invention.

Figure 4:
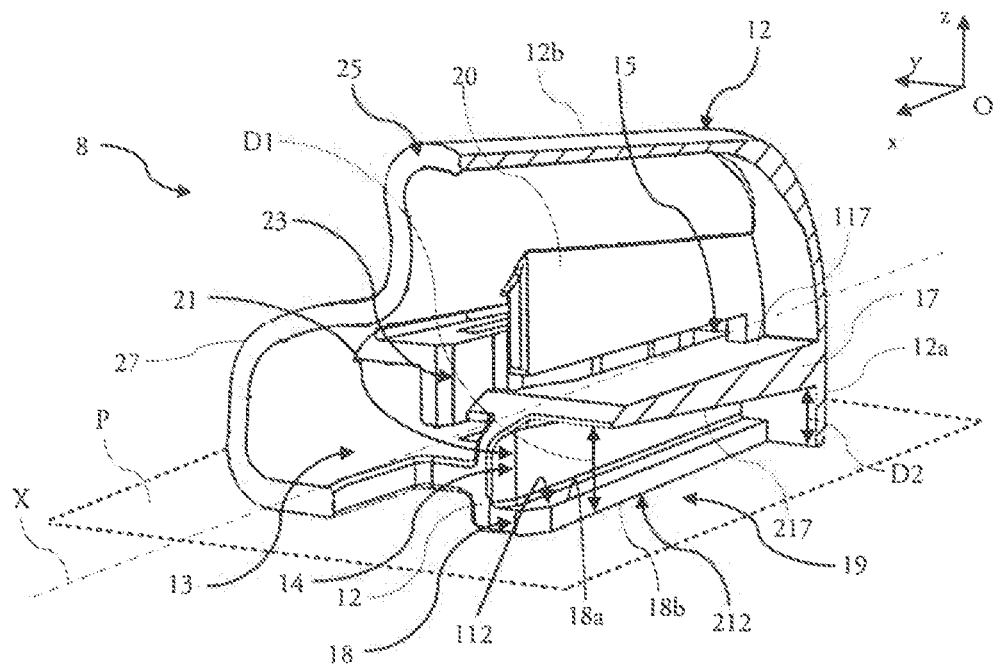
FIGS. 4 to 6 are views in perspective of a section in a longitudinal plane, in this case vertical, of the end piece according to three illustrative embodiments of the present invention.
Figure 5:
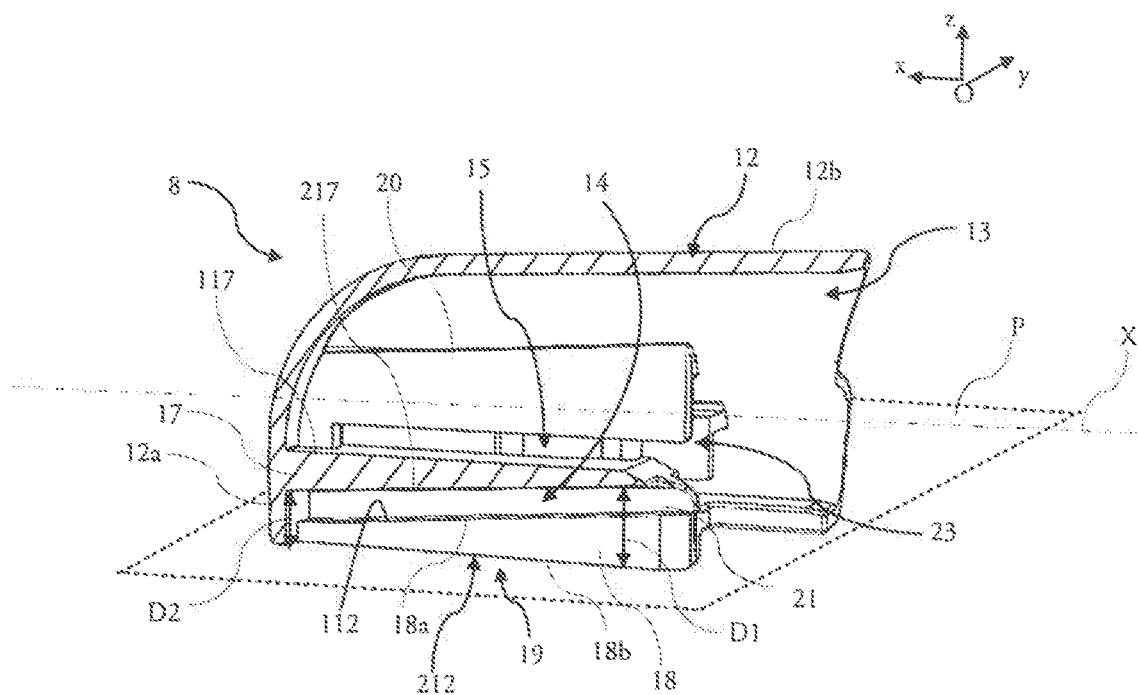
Figure 6:
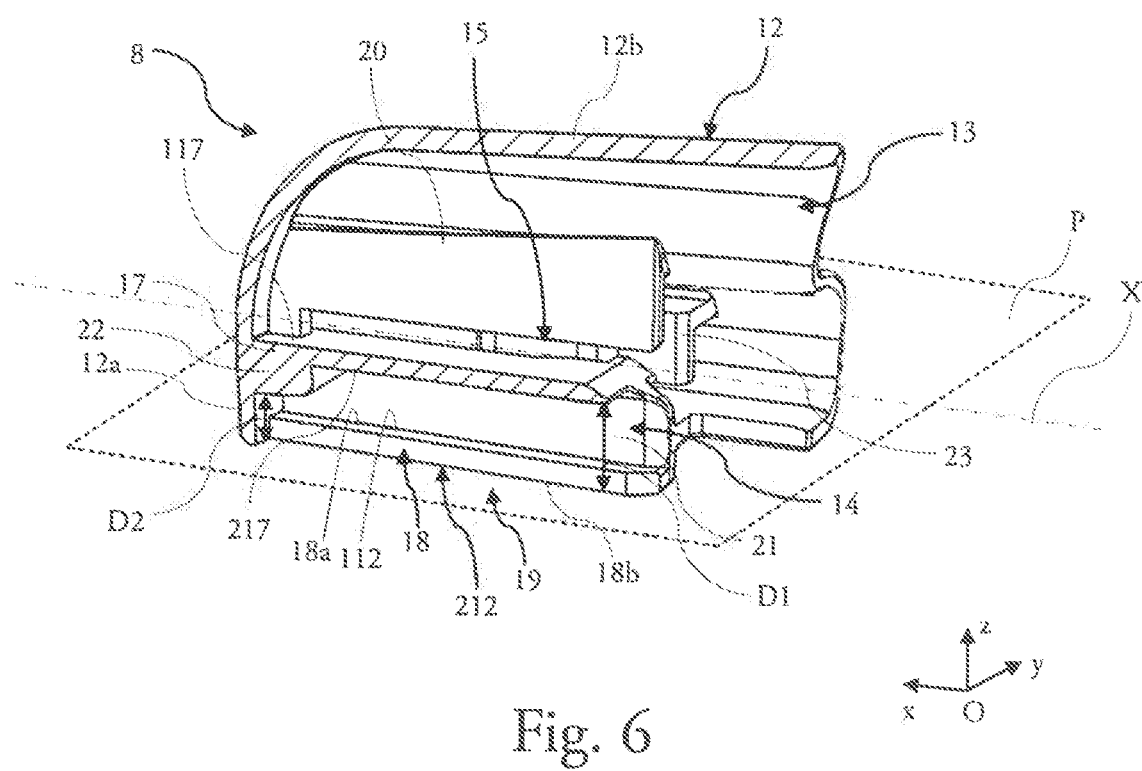

As represented in FIGS. 4 to 6, the second edges 18b of the sides 18 of the slot 19 are contained in a first horizontal longitudinal plane P, parallel to the plane Oxy.

FIGS. 4 to 6 make the sides 18 delimiting the slot 19, through which the first housing 14 discharges into the peripheral wall 12, partially visible. As previously described, said sides 18 each have the first edge 18a oriented towards the internal volume 13 of the end piece 8 and the second edge 18b oriented towards the external environment of the end piece 8. Said slot 19 is preferably delimited, longitudinally, by the bottom wall 12a of the peripheral wall 12 on the one hand, and by the inlet 21 of said first housing 14 on the other hand. By way of reminder, said inlet 21 of the first housing 14 is configured in order to permit the introduction of the wiper blade into said first housing 14.

As illustrated, the second edges 18b of the sides 18 are contained in the first horizontal longitudinal plane P, parallel to the plane Oxy of the orthonormal coordinate system.

As previously described, the lower wall 12c of the peripheral wall 12, in which the slot 19 is arranged, has the first face 112 oriented towards the first housing 14 and the second face 212 oriented towards the external environment of the end piece 8. Said second face 212 is contained in the first plane P containing the sides 18 of the slot 19, and more specifically the second edges 18b of said sides 18.

According to the foregoing, the first housing 14 is thus delimited vertically, that is to say in a direction parallel to the axis Oz of the orthonormal coordinate system, by the first face 112 of the lower wall 12c of the peripheral wall 12 and by the second face 217 of the longitudinal wall 17. The second housing 15, for its part, is delimited vertically, for example, by the first face 117 of the longitudinal wall 17 and by the one or more pillars 20 described previously.

The end piece 8 according to one feature of the present invention may also comprise one or a plurality of means of attachment 23 configured in order to maintain the end piece 8 on the structural element in said end piece 8, as described above, with reference to FIGS. 2 and 3.

According to one feature of the present invention, the end piece 8 exhibits a first distance D1 measured at the inlet 21 of the first housing 14, between the first plane P containing the sides 18 of the slot 19 and the second face 217 of the longitudinal wall 17, and a second distance D2, separate from the first distance D1 and measured parallel to said first distance D1, between the first plane P and the second face 217 of the longitudinal wall 17, said first distance D1 being greater than said second distance D2.

It will thus be appreciated that said first distance D1 and said second distance D2 are measured along two straight lines that are parallel one to the other and are also parallel to the axis Ox of the orthonormal coordinate system. In other words, said first distance D1 and said second distance D2 are measured along two straight lines that are respectively perpendicular to the first plane P and are separate from one another. Advantageously, the second distance D2 is measured as close as possible to the bottom wall 12a of the peripheral wall 12 delimiting the first housing 14.

The expression "measured at the inlet" is intended to denote a measurement taken in a straight line passing through a plane containing said inlet 21. The first distance D1 is thus measured in a straight line perpendicular to the first plane P and contained in the plane containing the inlet 21.

According to the present invention, and as may be seen in FIGS. 4 to 6, the first distance D1 is greater than the second distance D2. In particular, this difference between the first distance D1 and the second distance D2 makes it possible to generate the inclination of the longitudinal extremity of the wiper blade accommodated in the previously described first housing 14. All of the different illustrative embodiments described below thus make it possible to obtain said difference in distances, thanks to three examples of different arrangements of the end piece 8.

According to the first illustrative embodiment illustrated in FIG. 4, the first face 117 of the longitudinal wall 17 and the first edges 18a of the sides 18 of the slot 19 extend respectively in a second plane and in a third plane. Said second plane and said third plane are parallel to each other and extend parallel to the first plane P containing the second edges 18b of the sides 18 of the slot 19.

According to said first illustrative embodiment, the second face 217 of the longitudinal wall 17 extends in a fourth plane, said fourth plane being secant with the first plane, with the second plane and with the third plane mentioned above, in other words, the first face 117 and the second face 217 of the longitudinal wall 17 are not parallel.

According to this illustrative embodiment of the present invention, the longitudinal wall 17, and more specifically the second face 217 of said longitudinal wall 17, forms, together with the first plane P containing the second edges 18b of the sides 18 of the slot 19, an angle of between 3° and 6°. Advantageously, said angle is of between 4° and 6°. Even more advantageously, said angle is equal to, or substantially equal to 4.1°, a suchlike value being suitable for a large variety of glazed surfaces.

It will thus be appreciated that, according to this first illustrative embodiment, a transversal section of the first housing 14 is reduced by being displaced in the longitudinal axis X. The expression "transversal section" is intended to denote a section realized in a plane parallel to the plane Oyz of the orthonormal coordinate system.

Advantageously, in other words, the transversal section of the first housing 14 in the area of the inlet 21 is greater than the transversal section of this first housing 14 in the area of the bottom wall 12a. According to this first illustrative embodiment, said difference in the transversal section, associated with the difference between the first distance D1 and the second distance D2, makes it possible in particular to generate the inclination of the longitudinal extremity of the wiper blade accommodated in the first housing 14.

The end piece 8 realized according to the second illustrative embodiment illustrated in FIG. 5 differs from the end piece 8 realized according to the first illustrative embodiment in that the third plane containing the first edges 18a of the sides 18 of the slot 19 is parallel to the fourth plane containing the second face 217 of the longitudinal wall 17.

Thus, according to this second illustrative embodiment, the first plane P is parallel to the second plane containing the first face 117 of the longitudinal wall 17, the third plane containing the first edges 18a of the sides 18 of the slot 19 is parallel to the fourth plane containing the second face 217 of the longitudinal wall 17, said first plane P and said second plane both being secant with the third plane and with the fourth plane.

It will thus be appreciated that, according to said second illustrative embodiment, the transversal section of the first housing 14 is advantageously constant from the inlet 21 to the bottom wall 12a, since the first face 112 of the peripheral wall 12 and the second face 217 of the longitudinal wall 17 delimiting the first housing 14 are parallel to each other. According to this second illustrative embodiment, it is the inclination of the second face 217 of the longitudinal wall 17, for example, in combination with the inclination of the first edges 18a of the sides 18 of the slot 19, which makes it possible to generate the inclination of the extremity of the wiper blade accommodated in the first housing 14. As mentioned earlier, the expression "inclination" is intended to denote an inclination in a vertical longitudinal plane parallel to the plane Oxz.

According to the fourth illustrative embodiment illustrated in FIG. 6, the longitudinal wall 17 comprises a protrusion 22 which is integral with the second face 217 of said longitudinal wall 17 and which extends into the first housing 14. As illustrated, said protrusion 22 is integral with the longitudinal wall 17 which supports it. According to this fourth illustrative embodiment, the protrusion 22 is preferably supported on the bottom wall 12a of the peripheral wall 12 delimiting the first housing.

According to this fourth illustrative embodiment, the second distance D2 is measured at said protrusion 22. Advantageously, said second distance D2 is measured at a point of said protrusion 22 closest to the slot 19, that is to say closest to the lower wall 12c of the peripheral wall 12.

It will thus be appreciated that, according to this fourth illustrative embodiment, the transversal section of the first housing 14 is reduced at said protrusion 22, which makes it possible to generate the inclination of the extremity of the wiper blade accommodated in the first housing 14. Said transversal section of the first housing 14 may, however, be constant along said first housing 14, outside the protrusion 22.

The protrusion 22 may adopt a plurality of different configurations. For example, it may be a plain shoulder of the longitudinal wall 17. Said protrusion 22 may also take the form of a dome or even a droplet. Any other form making it possible to generate the inclination of the wiper blade is also feasible, without departing from the field of the invention.

According to said fourth illustrative embodiment, the fourth plane containing the second face 217 of the longitudinal wall 17 is parallel both to the first plane P containing the second edges 18b of the sides 18 of the slot 19, to the third plane containing the first edges 18a of the sides 18 of the slot 19 and to the second plane in which the first face 117 of the longitudinal wall 17 extends.

According to a variant of this fourth illustrative embodiment, the fourth plane containing the second face of the longitudinal wall is parallel to the third plane containing the first edges of the sides of the slot, and it is secant with the first plane containing the second edges of the sides of the slot.

According to other variants of said fourth example, the protrusion supported by the longitudinal wall may be disposed at any point on said longitudinal wall in the longitudinal axis X, with the exception of the inlet 21. In other words, according to these variant embodiments, the protrusion is integral only with the longitudinal wall, in particular without contact with the bottom wall of the peripheral wall.

The present invention thus proposes an end piece making it possible to generate an inclination of a longitudinal extremity of a wiper blade in order for the latter to be able to adapt to the curvature of a glazed surface in order to be in contact in an effective manner with the latter. The present invention thus makes it possible to ensure the optimal wiping of the glazed surface in order to clean it of all dirt.

The invention should not be confined to the means and configurations described and illustrated here, and it also extends to all equivalent means or configurations and to any technically effective combination of such means. In particular, the shape and the dimensions of the first housing may be modified without having an adverse effect on the invention, to the extent that they satisfy the functionalities described in the present document.

The invention claimed is:

1. An end piece configured for installation at a longitudinal extremity of a windscreen wiper, the end piece comprising:
    an internal volume;
    a peripheral wall which delimits the internal volume; and
    at least one first housing configured to accommodate a heel of a wiper blade and being in communication with a slot which passes through the peripheral wall, the slot being delimited by sides,
    the first housing extending longitudinally from an inlet, through which the heel of the wiper blade may be introduced into the first housing, and extending as far as a bottom wall of the peripheral wall,
    the first housing being delimited by a longitudinal wall disposed in the internal volume,
    wherein the longitudinal wall extends longitudinally from the bottom wall,
    wherein a first distance measured at the inlet between one of the sides delimiting the slot and the longitudinal wall is greater than a second distance separate from the first distance and measured parallel to the first distance, and
    wherein the second distance is measured between one of the sides of the slot and the longitudinal wall at the bottom wall.

2. The end piece according to claim 1, comprising a second housing configured to accommodate a structural element of the windscreen wiper, the second housing being delimited at least by the longitudinal wall.

3. The end piece according to claim 1, in which the longitudinal wall forms, together with a plane containing the sides of the slot, an angle of between 3° and 6°.

4. The end piece according to claim 1, in which the peripheral wall comprises a first face oriented towards the first housing, in which the longitudinal wall comprises a face oriented towards the first housing, the first face of the peripheral wall extending in a first plane, the face of the longitudinal wall extending in a second plane, the first plane and the second plane being parallel.

5. The end piece according to claim 4, in which the first plane containing the first face of the peripheral wall and the second plane containing the face of the longitudinal wall are secant with a plane containing the sides of the slot of the first housing.

6. The end piece according to claim 1, in which the longitudinal wall supports a protrusion emerging into the first housing of the end piece, the second distance being measured at said protrusion.

7. The end piece according to claim 6, in which the first housing is delimited longitudinally by a bottom wall of the peripheral wall, and in which the protrusion is supported on said bottom wall.

8. The end piece according to claim 1, in which the peripheral wall delimiting the end piece comprises a structure arranged in order to cover a terminal extremity of an air deflector.

9. A windscreen wiper comprising at least one wiper blade, at least one structural element, and at least one end piece according to claim 1.

10. A wiper system comprising a windscreen wiper according to claim 9, said windscreen wiper being connected to a driving arm by a connection device.

* * * * *